United States Patent
Karam

(10) Patent No.: US 7,697,251 B2
(45) Date of Patent: Apr. 13, 2010

(54) POWERED COMMUNICATIONS INTERFACE WITH DC CURRENT IMBALANCE COMPENSATION

(75) Inventor: Roger A. Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 889 days.

(21) Appl. No.: 11/516,075

(22) Filed: Sep. 6, 2006

(65) Prior Publication Data

US 2008/0062590 A1  Mar. 13, 2008

(51) Int. Cl.
 *H02H 3/22* (2006.01)
(52) U.S. Cl. ....................................... 361/111
(58) Field of Classification Search ................ 361/111; 370/242, 252; 375/258
See application file for complete search history.

(56) References Cited

U.S. PATENT DOCUMENTS

| | | | |
|---|---|---|---|
| 6,541,878 B1 * | 4/2003 | Diab | 307/17 |
| 6,804,351 B1 | 10/2004 | Karam | |
| 6,952,785 B1 * | 10/2005 | Diab et al. | 713/300 |
| 6,958,699 B1 | 10/2005 | Karam | |
| 7,279,851 B2 * | 10/2007 | Ball | 315/282 |
| 7,447,307 B2 * | 11/2008 | Molenda et al. | 379/403 |
| 7,457,252 B2 * | 11/2008 | Karam et al. | 370/252 |
| 7,577,104 B2 * | 8/2009 | Karam et al. | 370/252 |
| 2005/0197094 A1 * | 9/2005 | Darshan et al. | 455/402 |
| 2006/0115007 A1 | 6/2006 | Karam et al. | |
| 2006/0119478 A1 | 6/2006 | Karam et al. | |

* cited by examiner

*Primary Examiner*—Ronald W Leja
(74) *Attorney, Agent, or Firm*—Bainwood Huang

(57) ABSTRACT

A communications interface circuit includes data signal transformers for transmitting and receiving interface data signals. Each data signal transformer has a split interface-side winding that faces the cable connecting the interface with other equipment. Imbalance detection transformers each have a tapped interface-side winding (e.g., center-tapped) connected in series between split portions of the split interface-side winding of a respective data signal transformer. A DC circuit (source or load) has positive and negative supply terminals each connected to a tap connection of the tapped winding of an imbalance detection transformer. Imbalance detection and correction circuitry detects imbalance by (a) applying a relatively low-frequency imbalance detection signal to the local-side winding of the imbalance detection transformers, and (b) applying a detection function to a resulting imbalance detection signal obtained from the respective imbalance detection transformer, and then applies a compensation current to the local-side windings of the data signal transformers based on the detected imbalance.

19 Claims, 4 Drawing Sheets

POWERED COMMUNICATIONS INTERFACE WITH DC CURRENT IMBALANCE COMPENSATION

BACKGROUND

The invention pertains to the field of communications interfaces via which DC power is provided to operating circuitry.

Powered communications interfaces are utilized in data communications systems to provide operating power to devices over the same wires used to carry data communications signals, in a manner analogous to the traditional telephone system in which DC operating power is provided to subscriber equipment over the twisted-pair telephone wires. Today, there is widespread use of so-called "power over Ethernet" or POE technology, in which DC operating power is provided to digital telephones and other data equipment over unshielded twisted pair (UTP) cables connecting the data equipment with centralized data switches. In POE parlance, a device receiving power in this fashion is termed a "powered device" or PD, while a device that provides power for use by PDs is termed a "power sourcing equipment" or PSE.

An Ethernet communications interface utilizes transformer coupling of transmitted and received data signals in order to maintain electrical isolation between devices that are connected together by an Ethernet cable. DC circuitry (such as power source or load) is connected between respective center-taps of interface-side windings of transmit and receive transformers. Current flowing from the DC circuitry to an interface-side winding of one transformer is split into two components that flow through respective conductors of a twisted pair of the Ethernet cable, and likewise current flowing into the DC circuitry from the interface-side winding of the other transformer is the result of the adding together within the interface-side winding of two current components received from respective conductors of another twisted pair. Ideally, the respective paths of the current components are substantially matched so that the current splits into two substantially equal portions.

It is possible, however, that in any given system there is a mismatch or imbalance between the two current components of a powered communications interface, and if the imbalance is severe enough then problems may occur in the operation of the data communications interface. Such imbalance generally occurs due to a mismatch between the overall electrical resistances of the respective paths traveled by the current components. Such differences in resistance can occur in transformers, cables, connectors, and patch panels for example. One effect of this type of imbalance is the possibility of distortion on the data signals passing through the transformers, which if severe enough can cause data errors or even render the communications link unusable. The distortion, which is referred to as "droop", arises because of the magnetizing effect of the mismatched currents flowing through the transformer. The interface-side winding of the transformers is wound such that when equal DC current flows through them, the net magnetizing effect is zero. When the currents are unequal, the operating point of the transformer is shifted away from a desired zero-magnetization operating point, and pulse droop may result.

US Published Patent Applications 2006/0115007 A1 and 2006/0119478 A1 show a circuit delivering common mode inline power over a pair of conductors, in which any imbalance in the current carried by the conductors is detected and compensated with a bias current applied to counter the imbalance. The droop may be measured by coupling a receiver to the transmitter output at the physical-layer circuitry (PHY). The transmitter transmits a differential AC signal into the primary of the transformer. A receiver is coupled to receive and monitor the signal transmitted by the transmitter. A processor (or other suitable circuit) determines if there is droop by comparing the (possibly) distorted pulse (or characteristics thereof) to an expected or ideal pulse (or characteristics thereof). This may be done, for example, by measuring the peak amplitude or the amplitude at some point in the pulse, for example, near the end of the pulse where the droop usually tends to be more pronounced. This amplitude is compared to the expected or desired amplitude and a difference error signal related to the magnitude of the droop is generated. This is applied to a feedback loop which applies a correcting DC current to an appropriate node of the circuit in order to counter the unbalanced current flow on the wire side of the transformer and thereby bring the difference error signal to zero or nearly zero and so reduce the droop and correct the shape of the pulse.

SUMMARY

While the above-described techniques for detecting and correcting for the effect of DC current imbalance in a data signal transformer are effective, they nonetheless may exhibit shortcomings that make their use undesirable in certain applications. Specifically, the above techniques rely on use of the data signals themselves for detecting the DC current imbalance. It is often the case, however, that pulse droop affects lower-frequency pulses more than higher-frequency pulses, and thus the relatively high-frequency data signals may not be sufficiently representative of the actual amount of DC current imbalance. Moreover, because of the very short duration of the data pulses, the circuitry that performs the comparison with an ideal pulse may provide an undesirably low degree of resolution. It may be desirable in some applications to have a higher-resolution measurement of the imbalance so as to make a sufficiently accurate correction.

In accordance with the present invention, a powered communications interface circuit is disclosed that detects and compensates for DC current imbalance in a data signal transformer using dedicated imbalance detection signals, avoiding the use of the data signals. Additionally, the detection circuitry employs an imbalance detection transformer connected to the data signal transformer in a way that minimizes undesirable interaction between the imbalance detection signals and the data signals, while simultaneously achieving an accurate, high-resolution measurement of the imbalance.

The disclosed communications interface circuit includes first and second data signal transformers for transmitting and receiving interface data signals respectively. Each data signal transformer has a split interface-side winding that faces the external connection with other equipment. First and second imbalance detection transformers each have a tapped interface-side winding (e.g., center-tapped) connected in series between split portions of the split interface-side winding of a respective data signal transformer. A DC circuit (source or load) has positive and negative supply terminals each connected to a tap connection of the tapped winding of a respective imbalance detection transformer so as to form a DC current path having split portions, each including respective split portions of the interface-side winding of the data signal transformers. Thus, the imbalance detection transformers are inserted in series between the DC circuit and the data signal transformers, and thus carry the same DC current. To the extent that DC current imbalance exists and the imbalance detection transformers reasonably match the data signal transformers, the imbalance affects the imbalance detection transformers in substantially the same way as it does the data signal transformers, and thus imbalance can be measured at the imbalance detection transformers rather than at the data signal transformers.

The communications interface circuit further includes imbalance detection and correction circuitry coupled to respective windings of the data signal transformers and the imbalance detection transformers. The imbalance detection and correction circuitry is operative for each of the data signal transformers to (1) detect a level of imbalance of DC current between the split portions of the interface-side winding of the data signal transformer by (a) applying a relatively low-frequency imbalance detection signal to the local-side winding of the respective imbalance detection transformer, and (b) applying a detection function to a resulting AC signal obtained from the respective imbalance detection transformer, and (2) based on the detected level of DC current imbalance, apply a respective compensation current to a winding of the data signal transformer. In a disclosed embodiment, the compensation current is applied on the local-side winding of the data signal transformer, but similar methods may be used for applying such correction to the interface-side of the data signal transformer. One benefit of the alternative approach is that correction need only be applied to one side of the link for each data transformer.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
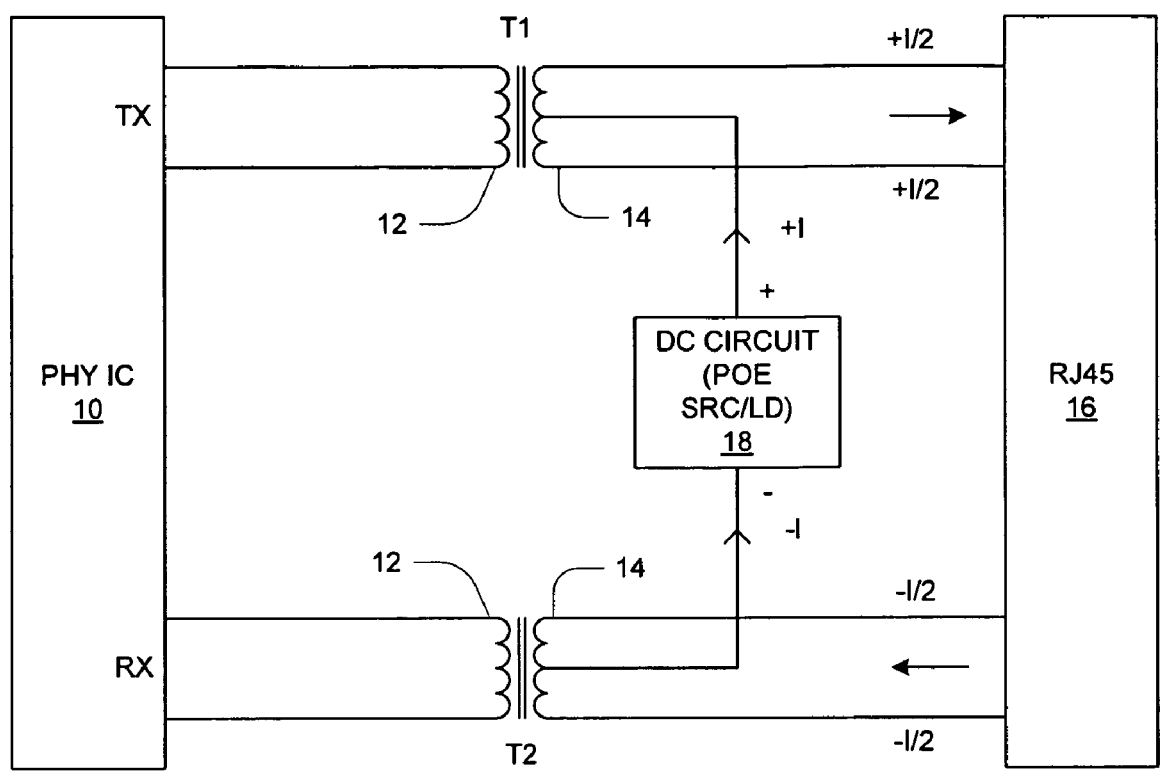
FIG. 1 is a simplified schematic diagram of a powered communications interface circuit as known in the art.

FIG. 1 illustrates a powered communications interface circuit as known in the art, specifically a so-called "power over Ethernet" or POE interface circuit. A physical-layer (PHY) integrated circuit (IC) 10 is connected to data signal transformers T1 and T2 for transmit (TX) and receive (RX) data respectively. Specifically, the PHY IC 10 is connected to windings 12 referred to herein as "local-side" windings. Respective interface-side windings 14 are connected to an RJ45 connector 20 to which an unshielded twisted-pair (UTP) cable can be attached to connect the powered communications interface circuit with a complementary circuit in remote powered data communications equipment. Each of the interface-side windings 14 has a respective center tap connected to a DC circuit 18, which may be a POE power source (SRC) if the interface circuit resides in power-sourcing equipment (PSE) or may be a POE load (LD) if the interface circuit resides in a powered device (PD).

In operation, when the powered communications interface circuit is coupled through a communications cable to a complementary interface circuit in separate equipment, a DC current flows along a DC current path that includes each of the interface-side windings 14 and the DC circuit 18. In the illustrated example, a current "I" is assumed. Ideally, the current I flows as two equal parts I/2 in each of the two halves of each winding 14 and respective terminals of the RJ45 connector 16. In the illustrated example, two inflowing currents combine within the interface-side winding 14 of the transformer T2 to form a current I that flows into the negative terminal of the DC circuit 18. The current I also flows out of the positive terminal of the DC circuit 18 to the winding 14 of the transformer T1, where it splits into two currents that exit via the RJ45 connector 16.

As described above, problems such as pulse distortion can arise if the DC currents in the two halves of each of the interface-side windings 14 become too imbalanced. It is desired to measure the amount of imbalance to enable corrective action to be taken in order to avoid the problems of pulse distortion.

Figure 2:
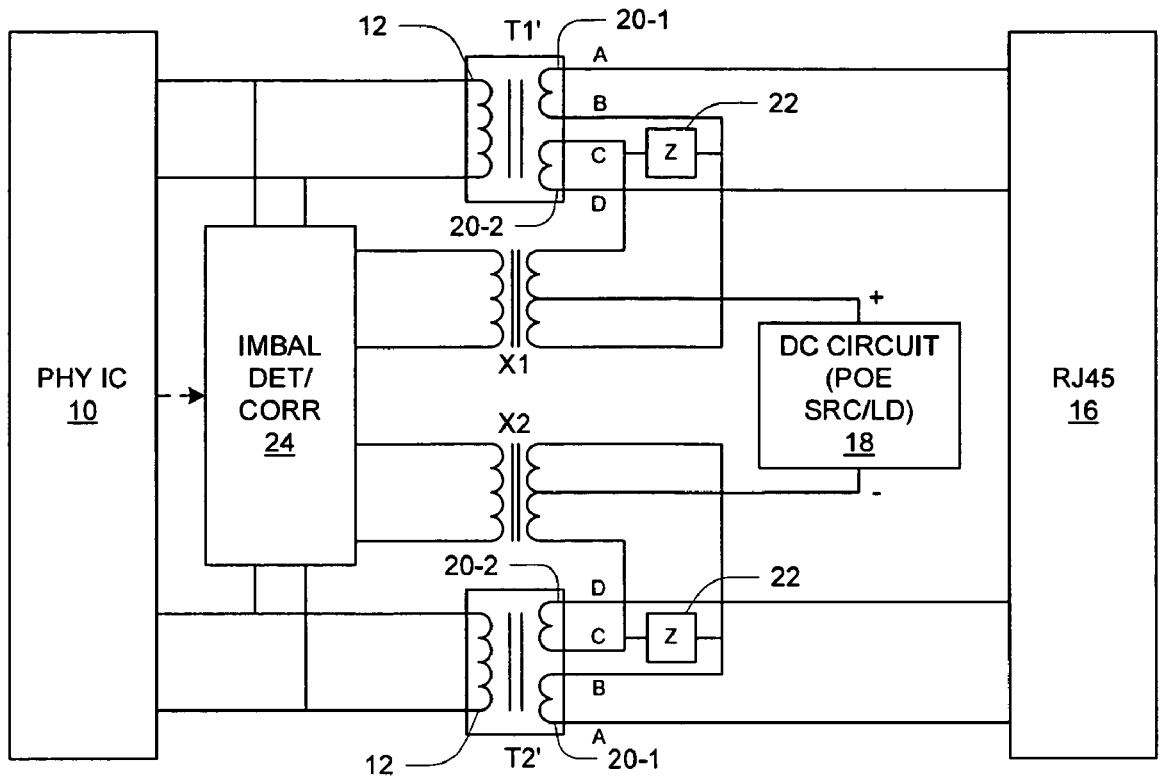
FIG. 2 is a simplified schematic diagram of a powered communications interface circuit in accordance with the present invention.

FIG. 2 shows a powered communications interface circuit incorporating circuitry for detecting and correcting current imbalance in the data signal transformers. Each data signal transformer T1' and T2' has a respective interface-side winding 20 that is split into two separate sub-windings 20-1, 20-2. The four terminals of these two windings are labeled A, B, C and D in FIG. 2 for ease of reference. The center-most terminals B, C of the interface-side winding 20 of each transformer T1', T2' are connected to one winding of a respective imbalance detection transformer X1, X2. An impedance circuit 22 is also connected to these two terminals B, C of each winding 14. As described in more detail below, the impedance circuit 22 serves the function of maintaining a functional short-circuit (substantially zero ohms impedance) at the frequency of the data signal while having higher impedance at the frequency of an imbalance detection signal. Specific examples are given below.

Each of the imbalance detection transformers X1, X2 is connected to an imbalance detection and correction (DET/CORR) circuit 24. This circuit operates to generate imbalance detection signals and apply them to the imbalance detection transformers X1 and X2; receive resulting imbalance detection signals from the transformers X1 and X2 which exhibit the effects of DC current imbalance if present; apply a detection function to the imbalance detection signals obtained from the imbalance detection transformers X1, X2; and based on result of the detection function, apply corresponding compensation currents to the local-side windings of the data signal transformers T1' and T2'. One noteworthy characteristic of the configuration of FIG. 2 is that the imbalance detection and correction circuitry 24 actually detects imbalance within the imbalance detection transformers X1, X2 rather than in the data signal transformers T1', T2'. However, the transformers X1, X2 can serve as very good mirrors or proxies for the transformers T1' and T2'. Whatever DC current imbalance exists in the interface-side winding 20 of transformer T1', for example, is exactly the same as that in the center-tapped winding of transformer X1. Also, the characteristics of these transformers can be matched (or otherwise made to have a known relationship to each other), such that the indication obtained from transformers X1, X2 is substantially the same as the indication that would be directly obtained from transformers T1', T2' if such were done.

The impedance circuit 22 may take any of a variety of forms. For example, it may be a simple resistor-capacitor (R-C) circuit or a more complex two-terminal circuit with component values chosen to yield the desired frequency-dependent response as described above. It may be desirable that the higher impedance match the impedance of the circuitry within the imbalance detection and correction circuit 24 that drives the imbalance detection transformers X1, X2, so as to minimize noise from transmission-line effects. The impedance circuit 22 may also include non-linear components such as diodes etc., and can have series and parallel elements, active and or passive components.

Figure 3:
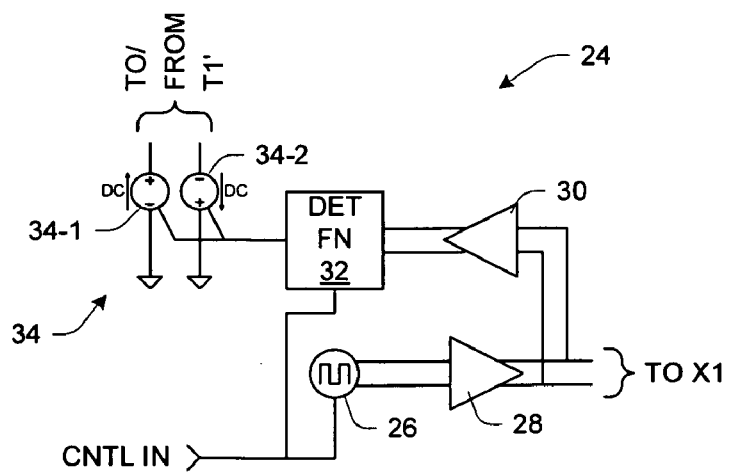
FIG. 3 is a schematic/block diagram of imbalance detection and correction circuitry within the powered communications interface circuit of FIG. 2.

FIG. 3 shows circuitry within the imbalance detection and correction circuit 24 for one of the transformers T1'; it will be appreciated that similar or identical circuitry is included for use with the other transformer T2'. A signal generator 26 operates in response to a control signal CNTL IN to apply an imbalance detection signal to the imbalance detection transformer X1 via a driver 28. The control signal CNTL IN may be provided by the PHY IC 10 or other higher-level operating circuitry. In one embodiment, the imbalance detection signal is a pulse signal. In alternative embodiments, other types of signals may be used such as signals having triangular/trapezoidal shape or signals having a more sinusoidal shape. The signal actually impressed upon the transformer X1 is received by a receiver 30 and applied to a detection function circuit (DET FN) 32, which operates to determine the amount of DC imbalance based on a detected characteristic of the received imbalance detection signal. Specific examples are provided below.

It may be desirable to add additional circuitry in the form of a filter to the PHY IC 10 to reduce any effect of noise that might be caused by the AC imbalance detection signals. For example, such filter circuitry may be designed to subtract any differential signals that are created by conversion from common-mode signals that appear on the center taps of the transformers T1' and T2' due to the injection of the imbalance detection signals via transformers X1 and X2. The presence of such noise may interfere with accurate reception of the data signals within the PHY IC 10, and thus such filter circuitry may enhance data reception in the presence of such noise.

The detection function circuit 32 provides control signals to compensation circuitry 34, which in the illustrated embodiment takes the form of DC current sources 34-1, 34-2 connected to the local-side winding 12 of the transformer T1'. The compensation circuitry 34 is utilized to apply a DC current to the local-side winding 12 that counteracts the effects of the current imbalance in the interface-side winding 20. For example, if the characteristic of the imbalance detection signal detected by the detection function circuit 32 corresponds to +40 mA of current imbalance in the interface-side winding 20, then a current of approximately −40 mA is generated by the compensation circuitry 34. The polarities "+" and "−" in this example are arbitrary and can be reversed without loss of generality—the overall operation is that of a negative feedback loop that adjusts the current provided by the compensation circuit 34 to drive the detected current imbalance toward zero.

Similar methods may be used to apply the compensation current to the interface-side windings 14 rather than the local-side windings 12. In particular, the approach shown in US Patent Application Publication US2006/0115007A1 may be utilized. For example, the DC current sources 34-1 and 34-2 can be configured appropriately to apply correction signals to the interface-side windings 14 such as nodes B and C for example.

Additionally, compensation may be deployed in real time (as data is flowing), at periodic intervals and or upon request, and or prior to data transmission. Such modes may be configurable as a function of system operations (e.g., based on operating speed, operating mode (duplex, half-duplex), and operating load current).

Figure 4:
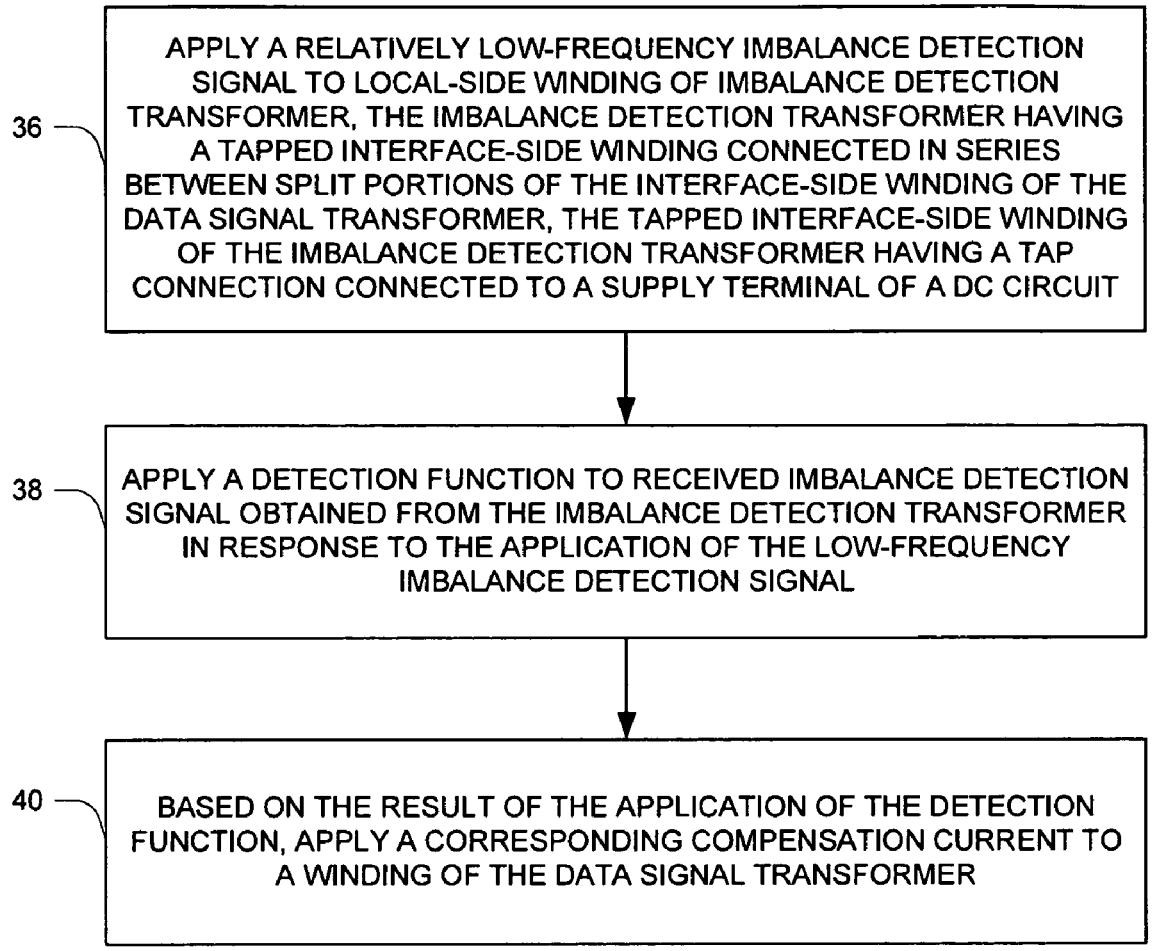
FIG. 4 is a flow diagram depicting an imbalance detection and correction process in the powered communications interface circuit of FIG. 2.

FIG. 4 illustrates the imbalance detection and correction operation in flow diagram form for one of the data signal transformers T1 or T2. In step 36, the signal generator 26 of FIG. 3 applies a relatively low-frequency imbalance detection signal to a local-side winding of the corresponding imbalance detection transformer X1 or X2. In step 38, the detection function circuit 32 applies a detection function to a received imbalance detection signal obtained from the imbalance detection transformer X1 or X2 in response to the application of the low-frequency imbalance detection signal. In step 40, based on the result of the application of the detection function, the compensation circuitry 34 applies a corresponding compensation current to a winding of the data signal transformer T1 or T2.

Figure 5:
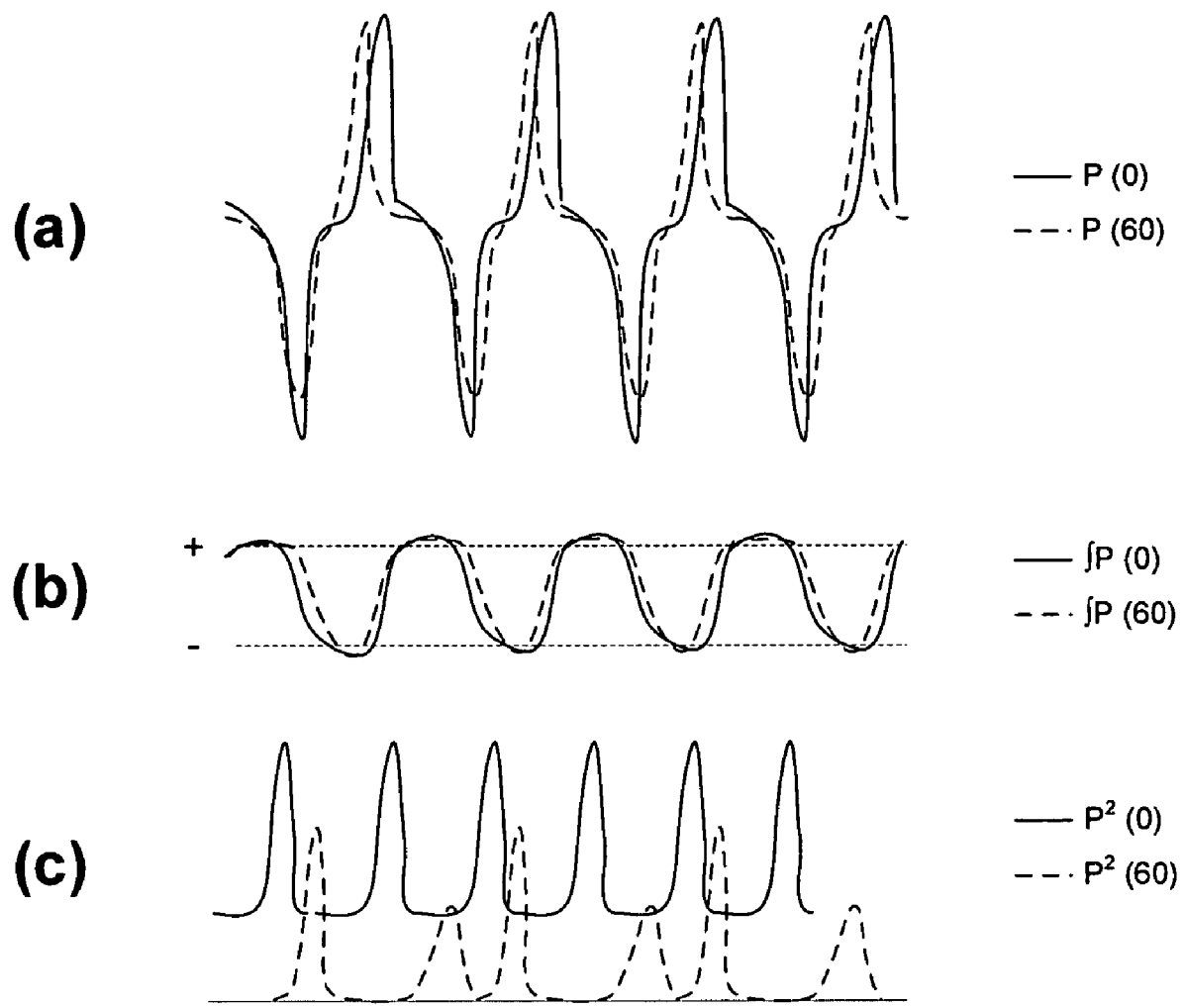
FIG. 5 (consisting of FIGS. 5(a), 5(b), and 5(c)) is a waveform diagram illustrating one of many examples of the operation of the powered communications interface circuit of FIG. 2.

FIG. 5 provides examples of imbalance detection signals and corresponding functions calculated within the detection function circuit 32 to detect DC current imbalance. In the illustrated examples, signals/functions are shown for zero imbalance (0) and for imbalance of 60 mA (60). In both cases, the imbalance detection signal as generated by the signal generator 26 has symmetric alternating positive-going and negative-going pulses of equal amplitude and duration.

FIG. 5(a) shows the imbalance detection signals P(0) and P(60) as appearing at X1 and received by the detection function circuit 32 for the two cases (0 mA and 60 mA of imbalance, respectively).

FIG. 5(b) illustrates the use of an integration function within the detection function circuit 32. The integral of the signal P(O) is shown as ∫P(O), and the integral of the signal P(60) is shown as ∫P(60). It will be observed that the signal ∫P(O) has a more symmetric appearance. This symmetry can be quantified by calculating the percentage of each cycle for which each signal is above a high threshold value "+" or below a low threshold value "−". In one simulation, the following values were obtained:

∫P(0)+24.0%
∫P(0)−12.5%
∫P(60)+15.2%
∫P(60)−4.8%

The above table illustrates how ∫P(0) can be discriminated from ∫P(60) based on the differences between the calculated percentages. Additionally, the amount by which the calculated percentages for a given received imbalance detection signal P(x) differ from the values for P(0) corresponds to a quantitative estimate of the amount of DC current imbalance, and thus can be used to provide a corresponding amount of compensation current via the compensation circuitry 34. The above operation can be summarized as calculating an integration function and measuring a duty-cycle of an integral signal generated by the integration function.

FIG. 5(c) illustrates the use of a squaring function within the detection function circuit 32. The square of the signals P(0) and P(60) are shown as $P^2(0)$ and $P^2(60)$ respectively. In this case, the discriminating aspect of the signals is their respective DC offset. It will be observed that the signal $P^2(60)$ has considerably lower DC offset than $P^2(0)$. The amount of this offset provides a quantitative estimate of DC current imbalance that can be used to generate a corresponding amount of compensation current. The above operation can be summarized as calculating a squaring function and measuring the DC offset of a square signal generated by the squaring function. Alternative signal processing techniques may be employed utilizing phase, amplitude, frequency, and any mathematical algorithm operation on any one or multiple signal parameters, which may have the effect of reducing cost and complexity, and improving the resolution of the detection algorithm. It may be necessary to deploy an integration function to filter out line noise such as 60 Hz noise, and/or any other noise generated by DC/DC converters operating within the PD or the PSE.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A powered communications interface circuit, comprising:
    first and second data signal transformers for transmitting and receiving interface data signals respectively, each data signal transformer having a split interface-side winding;
    first and second imbalance detection transformers each having a tapped interface-side winding connected in series between split portions of the split interface-side winding of a respective one of the data signal transformers;
    a DC circuit having positive and negative supply terminals each connected to a tap connection of the tapped winding of a respective one of the imbalance detection transformers; and
    imbalance detection and correction circuitry coupled to respective windings of the data signal transformers and the imbalance detection transformers, the imbalance detection and correction circuitry being operative for each of the data signal transformers to:
        (1) detect a level of imbalance of DC current between the split portions of the interface-side winding of the data signal transformer by (a) applying a relatively low-frequency imbalance detection signal to the local-side winding of the respective imbalance detection transformer, and (b) applying a detection function to a received imbalance detection signal obtained from the respective imbalance detection transformer; and
        (2) based on the detected level of DC current imbalance, apply a respective compensation current to a winding of the data signal transformer.

2. A powered communications interface circuit according to claim 1, further comprising first and second impedance circuits each connected between the split portions of the interface-side winding of a respective one of the data signal transformers, each impedance circuit having substantially zero ohms of impedance at a relatively high frequency of data signals of the powered communications interface circuit and greater than zero ohms of impedance at a relatively low frequency of the imbalance detection signal.

3. A powered communications interface circuit according to claim 2, wherein each of the impedance circuits has an impedance at the relatively low frequency of the imbalance detection signal that substantially matches an impedance of an imbalance detection signal driver in the imbalance detection and correction circuitry.

4. A powered communications interface circuit according to claim 1, wherein the detection function applied to the received imbalance detection signal comprises an integration function and a measurement of a duty-cycle of an integral signal generated by the integration function.

5. A powered communications interface circuit according to claim 1, wherein the detection function applied to the received imbalance detection signal comprises a squaring function and a measurement of DC offset of a square signal generated by the squaring function.

6. A powered communications interface circuit according to claim 1, wherein the imbalance detection signal is selected from the group consisting of.

7. A powered communications interface circuit according to claim 1, wherein the DC circuit is a DC source configured to provide DC power to a powered device coupled to the powered communications interface circuit by an attached communications cable.

8. A powered communications interface circuit according to claim 1, wherein the DC circuit is a DC load configured to receive DC power from a power sourcing equipment coupled to the powered communications interface circuit by an attached communications cable.

9. A method of detecting and correcting for a level of imbalance of DC current between separate legs of an interface-side winding of a data signal transformer, comprising:
    applying a relatively low-frequency imbalance detection signal to a local-side winding of an imbalance detection transformer, the imbalance detection transformer having a tapped interface-side winding connected in series between split portions of the interface-side winding of the data signal transformer, the tapped interface-side winding of the imbalance detection transformer having a tap connection connected to a supply terminal of a DC circuit;
    applying a detection function to a received imbalance detection signal obtained from the imbalance detection transformer in response to the application of the low-frequency imbalance detection signal; and
    based on the result of the application of the detection function, applying a corresponding compensation current to a winding of the data signal transformer.

10. A method according to claim 9, wherein applying the detection function comprises applying an integration function and measuring a duty-cycle of an integral signal generated by the integration function.

11. A method according to claim 9, wherein applying the detection function comprises applying a squaring function and measuring a DC offset of a square signal generated by the squaring function.

12. A method according to claim 9, wherein the imbalance detection signal is selected from the group consisting of.

13. A powered communications interface circuit for detecting and correcting for a level of imbalance of DC current between separate legs of an interface-side winding of a data signal transformer, comprising:
    means for applying a relatively low-frequency imbalance detection signal to a local-side winding of an imbalance detection transformer, the imbalance detection transformer having a tapped interface-side winding connected in series between split portions of the interface-side winding of the data signal transformer, the tapped interface-side winding of the imbalance detection transformer having a tap connection connected to a supply terminal of a DC circuit;
    means for applying a detection function to a received imbalance detection signal obtained from the imbalance detection transformer in response to the application of the low-frequency imbalance detection signal; and means for applying a compensation current to a winding of the data signal transformer, the compensation current corresponding to the result of the application of the detection function.

14. A powered communications interface circuit, comprising:
- a physical-layer data communications integrated circuit;
- a connector for connection to a cable to communicably couple the powered communications interface circuit to remote powered communications equipment;
- first and second data signal transformers for transmitting and receiving interface data signals respectively, each data signal transformer having a respective local-side winding and a respective split interface-side winding, each local-side winding being coupled to respective data terminals of the physical-layer data communications integrated circuit, each interface-side winding being coupled to respective terminals of the connector;
- first and second imbalance detection transformers each having a tapped interface-side winding connected in series between split portions of the split interface-side winding of a respective one of the data signal transformers;
- first and second impedance circuits each connected between the split portions of the interface-side winding of a respective one of the data signal transformers, each impedance circuit having substantially zero ohms of impedance at a relatively high frequency of data signals of the powered communications interface circuit and having a non-zero impedance at a relatively low frequency of an imbalance detection signal;
- a DC circuit having positive and negative supply terminals each connected to a tap connection of the tapped winding of a respective one of the imbalance detection transformers; and
- imbalance detection and correction circuitry coupled to respective windings of the data signal transformers and the imbalance detection transformers, the imbalance detection and correction circuitry including an imbalance detection signal driver having an impedance that substantially matches the non-zero impedance of each of the impedance circuits, the imbalance detection and correction circuitry being operative for each of the data signal transformers to:
  (1) detect a level of imbalance of DC current between the split portions of the interface-side winding of the data signal transformer by (a) applying a relatively low-frequency imbalance detection signal to the local-side winding of the respective imbalance detection transformer, and (b) applying a detection function to a received imbalance detection signal obtained from the respective imbalance detection transformer; and
  (2) based on the detected level of DC current imbalance, apply a respective compensation current to a winding of the data signal transformer.

15. A powered communications interface circuit according to claim 14, wherein the detection function applied to the received imbalance detection signal comprises a squaring function and a measurement of DC offset of a square signal generated by the squaring function.

16. A powered communications interface circuit according to claim 14, wherein the imbalance detection signal is selected from the group consisting of.

17. A powered communications interface circuit according to claim 14, wherein the DC circuit is a DC source configured to provide DC power to a powered device coupled to the powered communications interface circuit by an attached communications cable.

18. A powered communications interface circuit according to claim 14, wherein the DC circuit is a DC load configured to receive DC power from a power sourcing equipment coupled to the powered communications interface circuit by an attached communications cable.

19. A powered communications interface circuit according to claim 14, wherein the physical-layer data communications integrated circuit comprises filter circuitry operative to reduce noise that may be coupled onto the data terminals due to the application of the imbalance detection signal to the local-side winding of the respective imbalance detection transformer by the imbalance detection and correction circuitry.

* * * * *

UNITED STATES PATENT AND TRADEMARK OFFICE
CERTIFICATE OF CORRECTION

PATENT NO. : 7,697,251 B2
APPLICATION NO. : 11/516075
DATED : April 13, 2010
INVENTOR(S) : Roger A. Karam It is certified that error appears in the above-identified patent and that said Letters Patent is hereby corrected as shown below:

Claim 6, Column 8, Line 11, "from the group consisting of." should read -- from the group consisting of square wave signals, triangle signals, trapezoidal signals, and sinusoidal signals --.

Claim 12, Column 8, Line 50, "detection signal is selected from the group consisting of." should read -- detection signal is selected from the group consisting of square wave signals, triangle signals, trapezoidal signals, and sinusoidal signals --.

Claim 16, Column 10, Line 22, "selected from the group consisting of." should read -- selected from the group consisting of square wave signals, triangle signals, trapezoidal signals, and sinusoidal signals --.

Signed and Sealed this

Eighteenth Day of May, 2010

David J. Kappos
*Director of the United States Patent and Trademark Office*